United States Patent
Cui et al.

(10) Patent No.: US 12,052,597 B2
(45) Date of Patent: Jul. 30, 2024

(54) REFERENCE TIMING FOR TARGET DATA MEASUREMENT IN UNLICENSED SPECTRUM FOR NEW RADIO

(71) Applicant: APPLE INC., Cupertino, CA (US)

(72) Inventors: Jie Cui, Cupertino, CA (US); Qiming Li, Beijing (CN); Yang Tang, Cupertino, CA (US); Manasa Raghavan, Cupertino, CA (US); Xiang Chen, Cupertino, CA (US); Huaning Niu, Cupertino, CA (US); Dawei Zhang, Cupertino, CA (US); Hong He, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 392 days.

(21) Appl. No.: 17/593,187

(22) PCT Filed: Jan. 15, 2021

(86) PCT No.: PCT/CN2021/072231
§ 371 (c)(1),
(2) Date: Sep. 10, 2021

(87) PCT Pub. No.: WO2022/151378
PCT Pub. Date: Jul. 21, 2022

(65) Prior Publication Data
US 2023/0189032 A1    Jun. 15, 2023

(51) Int. Cl.
*H04W 24/10* (2009.01)
*H04B 17/318* (2015.01)
(Continued)

(52) U.S. Cl.
CPC .......... *H04W 24/10* (2013.01); *H04B 17/318* (2015.01); *H04W 56/0045* (2013.01); *H04W 74/0816* (2013.01)

(58) Field of Classification Search
None
See application file for complete search history.

(56) References Cited

U.S. PATENT DOCUMENTS

2019/0230475 A1 *  7/2019  Edge ................... G01S 5/0236
2019/0268870 A1    8/2019  Nurminen et al.
(Continued)

FOREIGN PATENT DOCUMENTS

WO    2020223692 A1    11/2020

OTHER PUBLICATIONS

Ericsson, "On the timing reference cell adaptation under DL LBT failure in reference cell", R4-2003412, 3GPP TSG-RAN WG4 #94-e-bis, Electronic Meeting, Agenda Item 6.1.5.13, Apr. 20-30, 2020, 2 pages.
(Continued)

Primary Examiner — Yaotang Wang
(74) Attorney, Agent, or Firm — Dorsey & Whitney LLP

(57) ABSTRACT

Provided is a method for a user equipment (UE) based on communication associated with New Radio (NR) in Unlicensed Spectrum (NR-U). The method includes obtaining information including a reference timing, setting up a target date measurement configuration in accordance with the reference timing; and performing a target data measurement in accordance with the target data measurement configuration.

19 Claims, 10 Drawing Sheets

(51) Int. Cl.
    *H04W 56/00*     (2009.01)
    *H04W 74/0816*     (2024.01)

(56) References Cited

U.S. PATENT DOCUMENTS

| 2019/0342801 | A1* | 11/2019 | Cui | H04W 72/23 |
| 2021/0377892 | A1* | 12/2021 | Chen | H04W 56/001 |
| 2022/0078873 | A1* | 3/2022 | Belleschi | H04W 28/24 |

OTHER PUBLICATIONS

Ericsson, "Terminology updates for NR-U", R4-2016409, 3GPP TSG-RAN WG4 Meeting #97-e, Electronic Meeting, Change Request 38.133 CR 1384 Current version 16.5.0, Nov. 2-13, 2020, 40 pages.

PCT/CN2021/072231, International Search Report and Written Opinion, Oct. 13, 2021, 9 pages.

ZTE, Sanechips, "Remaining issues on the initial access procedure for NR-U", R1-2003451, 3GPP TSG RAN WG1 #101, e-Meeting, Agenda Item 7.2.2.2.2, May 25-Jun. 5, 2020, 14 pages.

\* cited by examiner

REFERENCE TIMING FOR TARGET DATA MEASUREMENT IN UNLICENSED SPECTRUM FOR NEW RADIO

TECHNICAL FIELD

This application relates generally to wireless communication systems, and more specifically to a reference timing for a target data measurement in unlicensed spectrum for New Radio (NR).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE): fifth-generation (5G) 3GPP new radio (NR) standard: the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) based on communication associated with New Radio (NR) in Unlicensed Spectrum (NR-U) is provided that comprises obtaining information including a reference timing; setting up a target data measurement configuration in accordance with the reference timing; and performing a target data measurement in accordance with the target data measurement configuration.

According to an aspect of the present disclosure, a method for a base station based on communication associated with New Radio (NR) in Unlicensed Spectrum (NR-U) is provided that comprises generating information including a reference timing for transmission to a user equipment (UE), wherein the reference timing is used for setting up a target data measurement configuration: and obtaining, from the UE, a result of the target data measurement based on the target data measurement configuration.

According to an aspect of the present disclosure, an apparatus for a user equipment (UE) based on communication associated with New Radio (NR) in Unlicensed Spectrum (NR-U) is provided that comprises one or more processors configured to perform steps of the method for a user equipment (UE) based on communication associated with NR-U.

According to an aspect of the present disclosure, an apparatus for a base station based on communication associated with New Radio (NR) in Unlicensed Spectrum (NR-U) is provided that comprises one or more processors configured to perform steps of the method for a base station based on communication associated with NR-U.

According to an aspect of the present disclosure, a computer readable medium is provided that has computer programs stored thereon which, when executed by one or more processors, cause an apparatus to perform steps of the method for a user equipment (UE) base station based on communication associated with New Radio (NR) in Unlicensed Spectrum (NR-U).

According to an aspect of the present disclosure, an apparatus for a communication device is provided that comprises means for performing steps of the method for a user equipment (UE)/base station based on communication associated with New Radio (NR) in Unlicensed Spectrum (NR-U).

According to an aspect of the present disclosure, a computer program product is provided that comprises computer programs which, when executed by one or more processors, cause an apparatus to perform steps of the method for a user equipment (UE)/base station based on communication associated with New Radio (NR) in Unlicensed Spectrum (NR-U).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In order to increase the bandwidth and thus increasing the bitrate, a user equipment (UE) may be connected to more than one serving cell. In New Radio (NR), one serving cell may be designated as a primary cell (PCell), while some other cells may be secondary cells (SCells). In some cases, a PCell and SCells for UE may correspond to (supported by) a same base station. In some other cases. PCell and SCells may correspond to (supported by) different base stations.

In the wireless communication system, although a licensed spectrum is widely used, it is expensive and the total amount of the spectrum is limited. An unlicensed spectrum has become increasingly popular due to its relatively low license fee and wide usable bandwidth, and become the supplementary spectrum resources to enhance a network service.

In Long Term Evolution (LTE), the unlicensed spectrum has been used as a secondary cell spectrum resource for LTE device, that is, a carrier aggregation is formed between the unlicensed spectrum used as a supplementary carrier and the LTE licensed spectrum used as a primary carrier. In order to meet the higher demand for available frequency bands in 5G communication networks, the 3GPP organization has determined that the unlicensed spectrum (i.e., NR in unlicensed spectrum (NR-U) will also be used in 5G communication networks in addition to the conventional licensed spectrum.

However, due to the unlicensed characteristic, it is possible that an interference exists in the unlicensed spectrum. In order to avoid this situation, the UE may perform a measurement associated with the interference based on a measurement configuration and report the corresponding data, which reflects the interference situation, to the base station.

Figure 1:
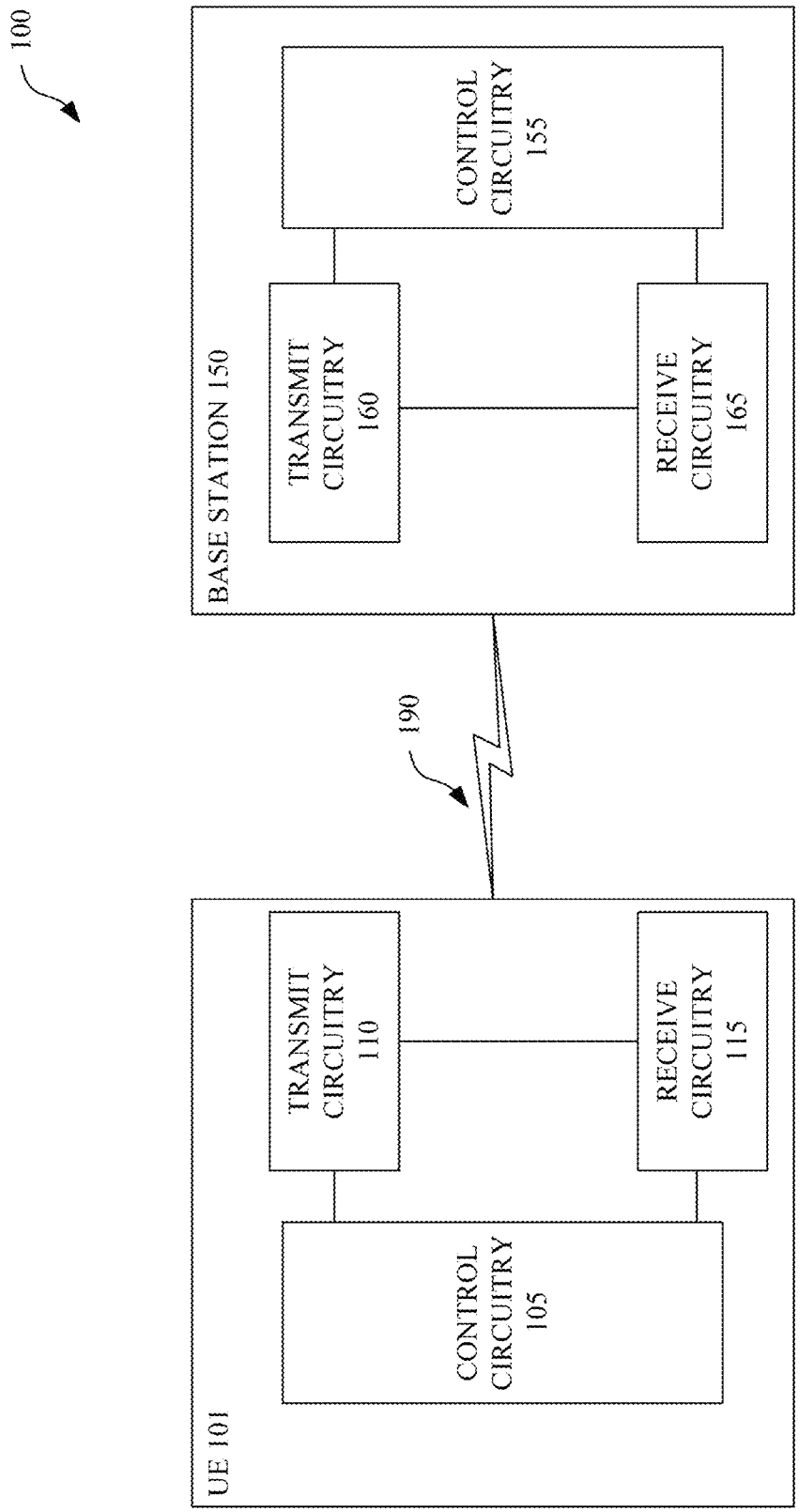
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360 degree coverage around the base station 150.

The UE 101 includes control circuitry 105 coupled with transmit circuitry 110 and receive circuitry 115. The transmit circuitry 1 10 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 1 10 and the receive circuitry 1 15 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

Figure 2:
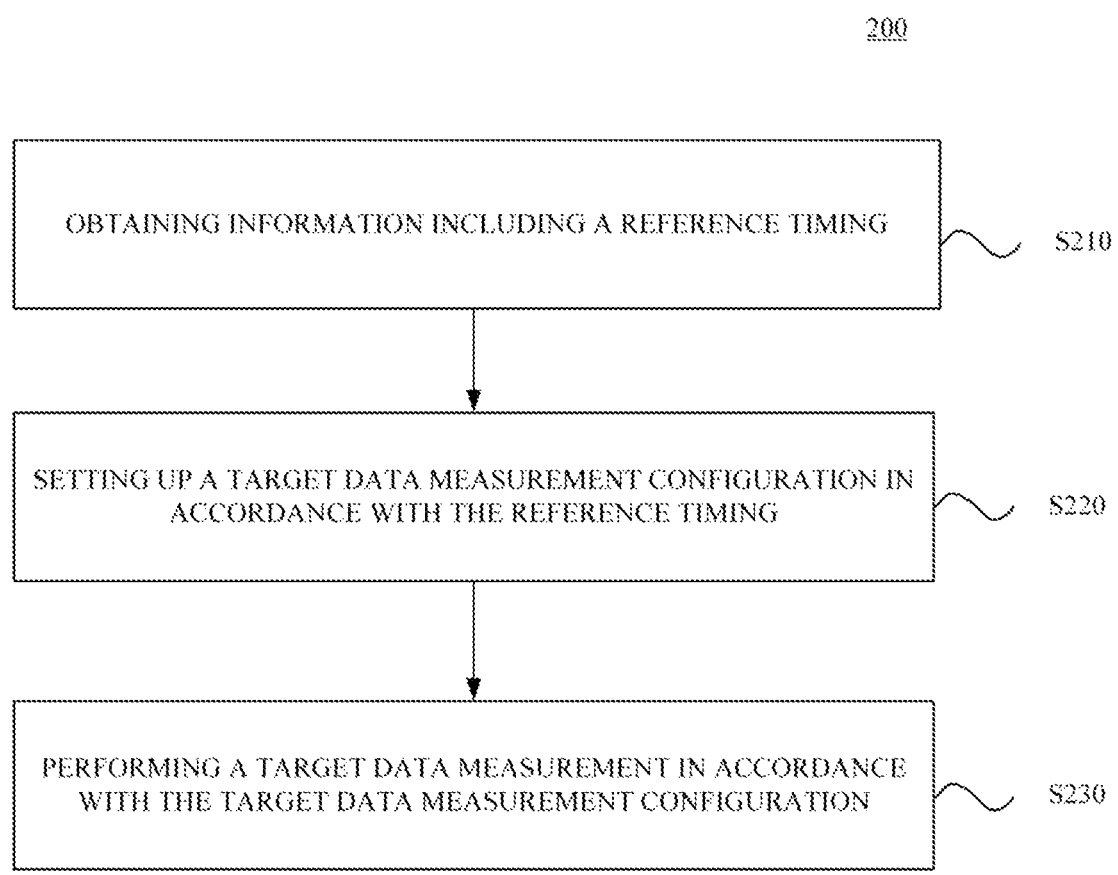
FIG. 2 illustrates a flowchart of an example method for a UE based on communication associated with New Radio (NR) in Unlicensed Spectrum (NR-U) in accordance with some embodiments.

In various embodiments, the UE 101 and the base station 150 in the wireless network 100 in FIG. 1 may be configured in various ways so as to enable the methods and apparatus described herein to be applied. For example. FIG. 2 illustrates a flowchart of a method 200 for a UE based on communication associated with NR-U in accordance with some embodiments of the present disclosure. In these embodiments, the UE 101 illustrated in FIG. 1 may be configured in accordance with the method 200.

Referring to FIG. 2, the method 200 may comprise: step S210, obtaining information including a reference timing; step S220, setting up a target data measurement configuration in accordance with the reference timing; and step S230, performing a target data measurement in accordance with the target data measurement configuration.

In some embodiments, the reference timing may comprise one or more of periodicity for the target data measurement, a subframe offset and a timeslot offset. Specifically, the periodicity for the target data measurement refers to a period with which the UE performs the corresponding measurement, typically in the order of milliseconds (ms), such as 40 ms, 80 ms, 160 ms, etc. The subframe offset refers to from which subframe in one period the UE starts to perform the corresponding measurement. The timeslot offset refers to from which timeslot in one period or subframe the UE starts to perform the corresponding measurement.

In some embodiments, the target data measurement configuration may comprise at least one of: RSSI measurement timing configuration (RMTC); Synchronization Signal/Physical Broadcast Channel block measurement timing configuration (SMTC); and Measurement Gap (MG) configuration.

In accordance with the method 200, a target data measurement in unlicensed spectrum associated with the NR is accurately implemented based on the obtained information including the reference timing. In addition, the interference in the unlicensed spectrum may be accurately monitored and further avoided especially in the above embodiments.

Typically, there are three configurations for implementing the communication associated with the NR-U. The first configuration is based on carrier aggregation between NR in licensed spectrum and the NR-U. That is, the licensed spectrum for the NR is used as an anchor, through which both a Radio Resource Control (RRC) signaling and data can be transmitted to the UE, while through the unlicensed spectrum for the NR only the data can be transmitted to the UE. The second configuration is based on dual connectivity between LTE in licensed spectrum and the NR-U. That is, the licensed spectrum for the LTE is used as an anchor, and the RRC signaling and data can be transmitted to the UE through both the licensed spectrum for the LTE and the unlicensed spectrum for the NR. Both the first configuration and the second configuration may be defined as licensed spectrum assisted access (LAA). And the third configuration is based on stand-alone NR-U. That is, no licensed spectrum needs to be used as an anchor.

In some embodiments, when the first configuration is selected. i.e., the communication is associated with carrier aggregation between NR in licensed spectrum and the NR-U, the step S210 of obtaining the information including the reference timing may comprise obtaining a timing associated with a reference cell as the reference timing, wherein the reference cell is an active serving cell.

Through the first configuration, i.e., the carrier aggregation, bandwidth can be increased and therefore data rates or throughputs for both uplink and downlink can be increased, thereby improving the network efficiency.

In some embodiments, the reference cell is a Primary Cell (PCell), and the reference tinning is a timing of one of active serving cells, which are in the same Primary Timing Advance Group (pTAG) as the PCell. In this way, it is ensured that a target data measurement can be performed and a result thereof can be obtained, and the operations may also be simplified since it is not necessary to obtain the reference timing from the network side.

A Timing Advance Group (TAG) can be defined as a group of serving cells (which may provide services to the UE) that use the same reference timing, and the same Timing Advance (TA) which refers to the time it takes for a signal to reach the network side from the LIE and is used to compensate for the propagation delay of the signal transmitted from the network side to the UE and from the UE to the network side. The TAG including a PCell is defined as a pTAG and the TAG that does not include the PCell is called a secondary TAG (sTAG).

As described above, the TAG uses one of the serving cells in the group as a reference cell, which is used by the UE to derive timing information. For example, the UE can derive timing information based on a synchronization signal (e.g., PSS or SSS) in the reference cell. Typically, the PCell is selected as the reference cell in the pTAG, while in the sTAG, which does not include the PCell, the UE can select one cell from among the cells in the sTAG.

In some embodiments, the step S220 of setting up a target data measurement configuration in accordance with the reference timing may comprise determining one or more of a subframe period, a system frame number (SFN) and a subframe number.

In some implementations, the subframe period may be determined by the periodicity for the target data measurement and the number of the subframes.

As specified in TS 38.331 and TS36.331, the subframe period may be determined by the following:

$$T = \text{Periodicity}/10$$

wherein Periodicity denotes the periodicity for the target data measurement, and 10 denotes the number of the subframes since each of the systems typically includes 10 subframes.

In some other implementations, the SEN may be determined by the subframe period and the subframe offset.

As specified in TS 38.331 and TS36.331, the SEN may be determined by the following:

$$SFN \bmod T = \text{FLOOR}(\text{Offset}/10)$$

wherein Offset denotes the subframe offset.

In some other implementations, the number of the subframes may be determined by the subframe offset.

As specified in TS 38.331 and TS36.331, the number of the subframes may be determined by the following:

$$\text{Subframe} = \text{Offset} \bmod 10$$

wherein Subframe denotes the number of the subframes and Offset denotes the subframe offset.

After using the PCell as the reference cell, and performing a target data measurement in accordance with the target data measurement configurations described above, the UE may selectively use the current reference cell or another serving cell, which is in the same pTAG as the current reference cell, as a new reference cell based on a result of the target data measurement.

In some implementations, the result of the target data measurement may be one or more of Reference Signal Received Power (RSRP). Reference Signal Received Quality (RSRQ), RSSI, and Channel Occupancy (CO). For example, when the value of the RSRP and or RSRQ is relatively high, the UE may use another serving cell as a new reference cell so as to improve the accuracy of the next measurement.

Figure 3:
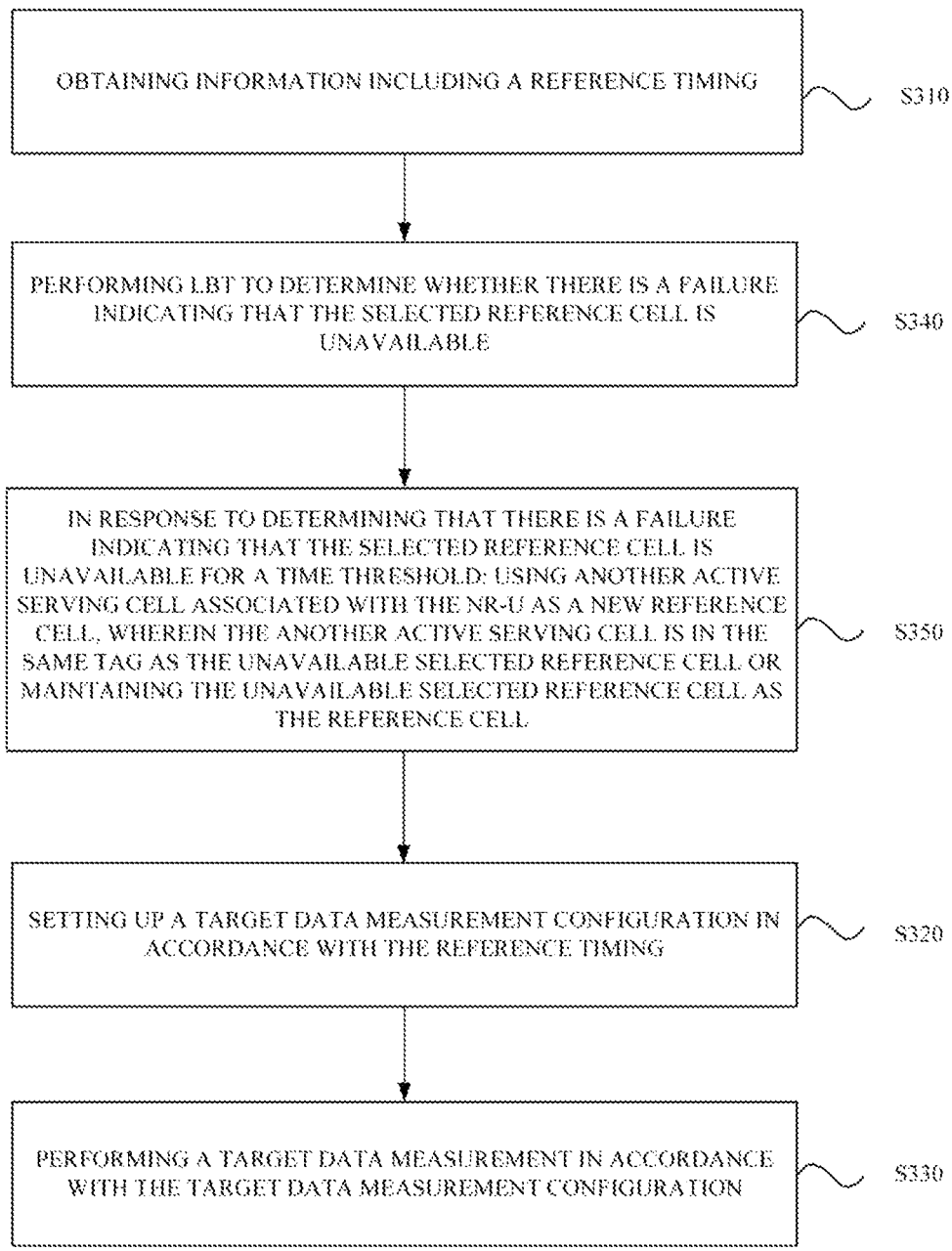
FIG. 3 illustrates a flowchart of another example method for a UE based on communication associated with NR-U in accordance with some other embodiments.

FIG. 3 illustrates a flowchart of another example method 300 for a UE based on communication associated with NR-U in accordance with some other embodiments, in which the first configuration is selected.

In these embodiments, obtaining a timing associated with a reference cell as the reference timing may comprise: obtaining, from network side, an indication of which active serving cell associated with the NR-U to be selected as the reference cell; and obtaining a timing of one of active serving cells, which are in the same Timing Advance Group (TAG) as the indicated reference cell, as the reference timing.

In this way, the accuracy of the measurement can be improved since the reference cell and the reference timing are directly associated with the serving cell to be measured due to the connectivity between different serving cells.

Note that, in the present disclosure, when describing a communication between a UE and a network side (for example, transmitting data to the network side, or receiving signaling and data from the network side), the communication between the UE and the network side may include the communication between the UE/an apparatus of the UE and a network device (node) in the network. Similarly, in the present disclosure, when describing a communication between a UL and a serving cell including but not limiting to PCell. PSCell and SCell (for example, transmitting data to the PCell or the SCell. or receiving data from the PCell or the SCell), the communication between the UE and the serving cell may include the communication between the US/an apparatus of the UE and the network device (node) of the cell including but not limiting to the PCell, the PSCell and the SCell. Also note that, the expressions "network side", "network device" and "node" may be used herein interchangeably.

Referring to FIG. 3, the method 300 may comprise steps after step S310 and before steps S320 and S330: step S340, performing Listen Before Talk (LBT) to determine whether there is a failure indicating that the selected reference cell is unavailable; and step S350, in response to determining that there is a failure indicating that the selected reference cell is unavailable for a time threshold, using another active serving cell associated with the NR-U as a new reference cell, wherein the another active serving cell is in the same TAG as the unavailable selected reference cell.

Due to the unlicensed characteristic of the NR-U, the problem of interference and transmission conflict may be raised. By performing LBT and monitoring the failure, the availability of the reference cell can be ensured. In addition, since the selected reference cell is associated with the NR-U (for example, the PCell may obtain the timing of the serving cells associated with the NR-U due to the connectivity between the PCell and the serving cells associated with the NR-U), the accuracy of the measurement of the serving cells associated with the NR-U can be further improved.

In some implementations, the time threshold may be any proper predefined value, such as in the order of milliseconds (ms).

Alternatively, step S350 may comprise: in response to determining that there is a failure indicating that the selected reference cell is unavailable for a time threshold, maintaining the unavailable selected reference cell as the reference cell.

Typically, the failure indicating that the selected reference cell is unavailable will not last too long (for example, 2 s or 3 s), that is, after this duration, the selected reference cell may be available again. In this case, by maintaining the unavailable selected reference cell as the reference cell, the number of times to reselect a new reference cell can be reduced, thereby reducing the computation of the LIE Similarly, after obtaining the indication of which active serving cell associated with the NR-U to be selected as the reference cell, the UE may selectively use the current reference cell or another serving cell, which is in the same TAG as the current reference cell, as a new reference cell, based on a result of the target data measurement.

In some embodiments, when the second configuration is selected, i.e., the communication is associated with dual connectivity between Long Term Evolution (LTE) in licensed spectrum and the NR-U, the step S210 of obtaining the information including the reference timing may comprise obtaining a timing associated with a reference cell as the reference timing, wherein the reference cell is an active serving cell.

Through the second configuration, i.e., the dual connectivity, the time delay can be efficiently reduced, and the throughputs and transmission speed and reliability of data or signaling can be improved.

In some embodiments, in the second configuration. MG is configured from LTE Master Node (MN) as specified, and one or more of the RMTC and the SMTC is also configured from the LTE MN.

In this case, in some implementations, the reference cell is a Primary Cell (PCell), and the reference timing is a timing of one of active serving cells, which are in the same Primary Timing Advance Group (pTAG) as the PCell.

In this way, it is ensured that a target data measurement can be performed and a result thereof can be obtained, since no LBT is necessary for the licensed spectrum and the selected reference cell is ensured to be available. Moreover, the operations may also be simplified since it is not necessary to obtain the reference timing from the network side.

Still in the case but in some other implementations, obtaining a timing associated with a reference cell as the reference timing may comprise: obtaining, from network side, an indication of which active serving cell associated with the LTE in licensed spectrum to be selected as the reference cell; and obtaining a timing of one of active serving cells, which are in the same Timing Advance Group (TAG) as the indicated reference cell, as the reference timing.

Similarly, the communication between the UE and the network side (for example, receiving data from the network side or sending data to the network side) may include but not be limited to the communication between the UE and the base station (for example, receiving command and/or data from the base station or sending data to the base station).

In this way, the accuracy of the measurement can still be improved even though the network side may not directly determine the serving cell associated with the NR-U as the reference cell. For example, the PCell may determine the optimum serving cell associated with the LTE as the reference cell based on the obtained timing thereof and the obtained timing of the serving cell to be measured, which is associated with the NR-U.

In the above embodiments, after obtaining a timing associated with a reference cell as the reference timing, and performing a target data measurement in accordance with the target data measurement configurations described above, the UE may selectively use the current reference cell or another serving cell, which is in the same TAG as the current reference cell, as a new reference cell, based on a result of the target data measurement.

In some other embodiments, in the second configuration. MG is configured from LTE MN as specified, and one or more of the RMTC and the SMTC is configured from NR-U Secondary Node (SN).

In this case, in some implementations, the reference cell is a Primary Secondary Cell (PSCell), and the reference timing is a timing of one of active serving cells, which are in the same Timing Advance Group (TAG) as the PSCell.

Still in the case but in some other implementations, obtaining a timing associated with a reference cell as the reference timing may comprise obtaining, from network side, an indication of which active serving cell associated with the NR-U to be selected as the reference cell; and obtaining a timing of one of active serving cells, which are in the same Timing Advance Group (TAG) as the indicated reference cell, as the reference timing.

For the specific implementations and technical effects of these embodiments, reference can be made to the above description in the embodiments where the MG is configured from LTE MN as specified, and one or more of the RMTC and the SMTC is also configured from the LTE MN. In addition, since the PSCell is capable of determine the serving cell associated with the NR-U as the reference cell, the reference timing may be more accuracy, thereby facilitating the measurement.

In the above embodiments, after obtaining, from the network side, the indication of which active serving cell to be selected as the reference cell, the UE may perform LBT to determine whether there is a failure indicating that the reference cell is unavailable; and in response to determining that there is a failure indicating that the reference cell is unavailable for a time threshold, the UE may use another active serving cell associated with the NR-U as a new reference cell, wherein the another active serving cell is in the same Timing Advance Group (TAG) as the unavailable selected reference cell; or maintain the unavailable selected reference cell as the reference cell.

Similarly, the UE may also selectively use the current reference cell or another serving cell, which is in the same TAG as the current reference cell, as a new reference cell, based on a result of the target data measurement.

For the specific implementations and technical effects of the similar steps of the method in the second configuration, reference can be made to the related description in the embodiments corresponding to the first configuration. Therefore, details are not repeated herein.

In some embodiments, when the third configuration is selected, i.e., the communication is associated with stand-alone NR-U, the step S210 of obtaining the information including the reference timing may comprise obtaining a timing associated with a reference cell as the reference timing, wherein the reference cell is an active serving cell.

Through the third configuration. i.e., the stand-alone NR-U, the small bandwidth caused by insufficient 5G spectrum may be alleviated, and therefore the throughputs and transmission speed and reliability of data of signaling can be improved.

In some embodiments, the reference cell is a Primary Cell (PCell), and the reference timing is a timing of one of active serving cells, which are in the same Primary Timing Advance Group (pTAG) as the PCell.

In some other embodiments, obtaining a timing associated with a reference cell as the reference timing may comprise: obtaining, from network side, an indication of which active serving cell associated with the NR-UI to be selected as the reference cell; and obtaining a timing of one of active serving cells, which are in the same Timing Advance Group (TAG) as the indicated reference cell, as the reference timing.

In the above embodiments, after obtaining a timing associated with a reference cell as the reference timing, the UE may perform LBT to determine whether there is a failure indicating that the reference cell is unavailable; and in response to determining that there is a failure indicating that the reference cell is unavailable for a time threshold, the UE may use another active serving cell associated with the NR-U as a new reference cell, wherein the another active serving cell is in the same Timing Advance Group (TAG) as the unavailable selected reference cell; or maintain the unavailable selected reference cell as the reference cell.

Similarly, the UE may also selectively use the current reference cell or another serving cell, which is in the same TAG as the current reference cell, as a new reference cell, based on a result of the target data measurement.

For the specific implementations and technical effects of the similar steps of the method in the third configuration, reference can be made to the related description in the embodiments corresponding to the first configuration or the second configuration. Therefore, details are not repeated herein.

Figure 4:
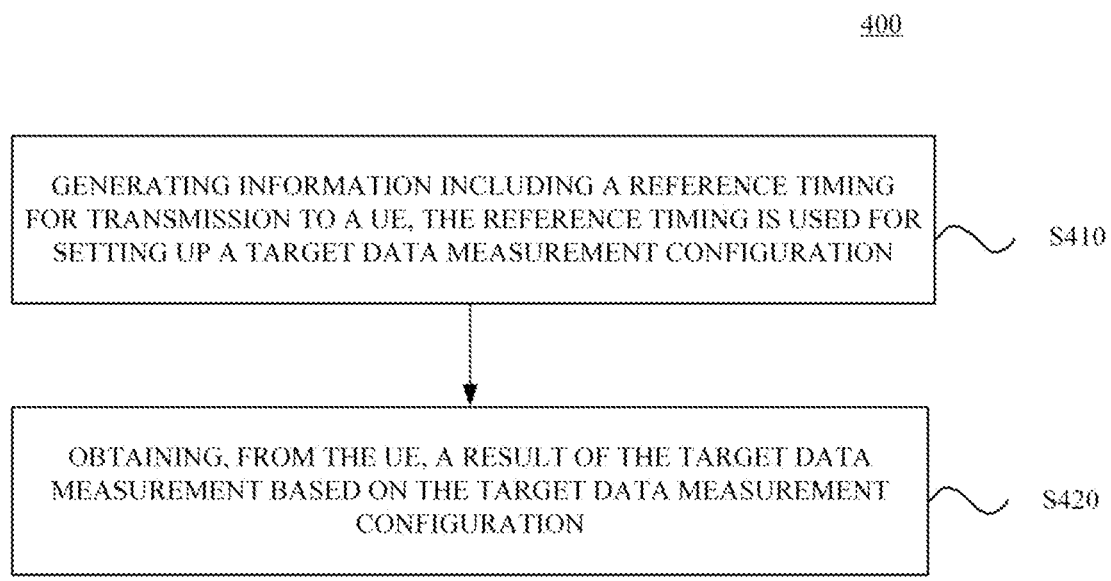
FIG. 4 illustrates a flowchart of an exemplary method for a base station based on communication associated with NR-U in accordance with some embodiments.

FIG. 4 illustrates a flowchart for an exemplary method 400 for a base station based on communication associated with NR-U in accordance with some embodiments.

Referring to FIG. 4, the method 400 may comprise: step S410, generating information including a reference timing for transmission to a user equipment (UE), and step S420, obtaining, from the UE, a result of the target data measurement based on the target data measurement configuration.

In some embodiments, the target data measurement configuration may comprise at least one of RSSI measurement timing configuration (RMTC); Synchronization Signal/Physical Broadcast Channel block measurement timing configuration (SMTC); and Measurement Gap (MG) configuration.

In some embodiments, the step S410 of generating information including a reference timing for transmission to the UE may comprise generating an indication of which active serving cell to be selected as a reference cell, wherein a timing of one of the active serving cells, which are in the same Timing Advance Group (TAG) as the indicated reference cell, is to be used as the reference timing.

In some implementations, the indication of which active serving cell to be selected as a reference cell is determined in accordance with different configurations described above, and may refer to the corresponding description with respect to FIGS. 2-3.

In accordance with the method 400, a target data measurement in unlicensed spectrum associated with NR can be accurately implemented based on the generated information including the reference timing. By selecting different serving cells as the reference cell, an optimum result of the measurement may be obtained in different configurations.

Figure 5:
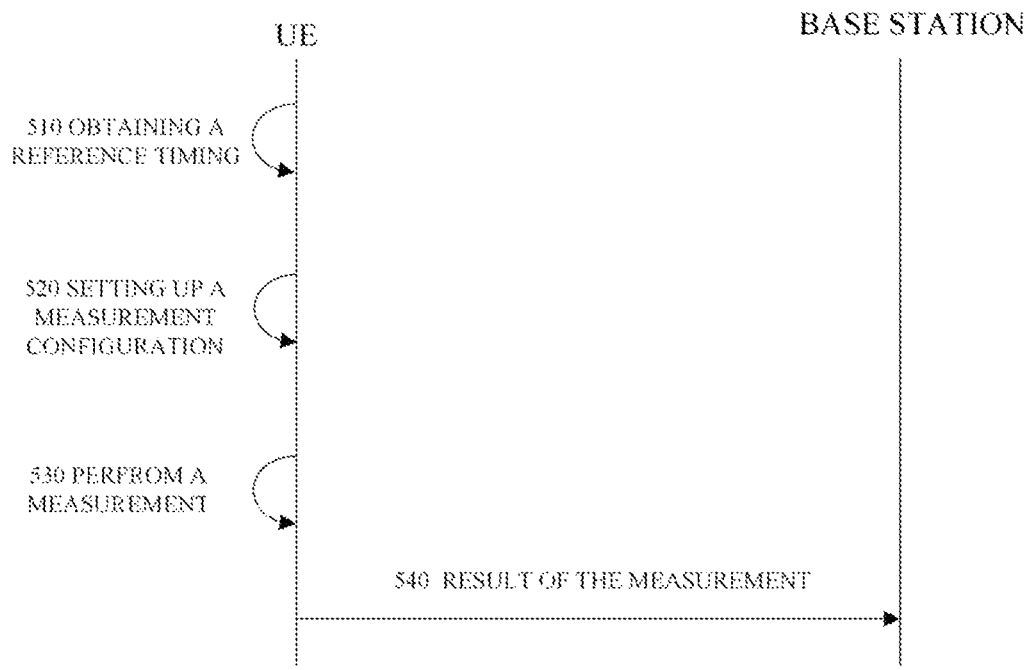
FIG. 5 illustrates a flowchart of exemplary steps for a target data measurement according to some embodiments.

FIG. 5 illustrates a flowchart of exemplary steps for a target data measurement according to some embodiments.

Referring to FIG. 5, at step S510, the UE may obtain information including a reference timing in accordance with the current configuration. Step 510 can be implemented according to the description with reference to some of the embodiments of step S210 and/or step S310.

Then at step S520, the UE may set up a target data measurement in accordance with the reference timing. Step 520 can be implemented according to the description with reference to step S220 and/or step S320.

Then at step S530, the UE may perform a target data measurement based on the target data measurement configuration. Step 530 can be implemented according to the description with reference to step S230 and/or step S330.

After the measurement is performed, at step 540, a result of the target data measurement may be transmitted from the UE to the base station. Step 540 can be implemented according to the description with reference to step S420.

Figure 6:
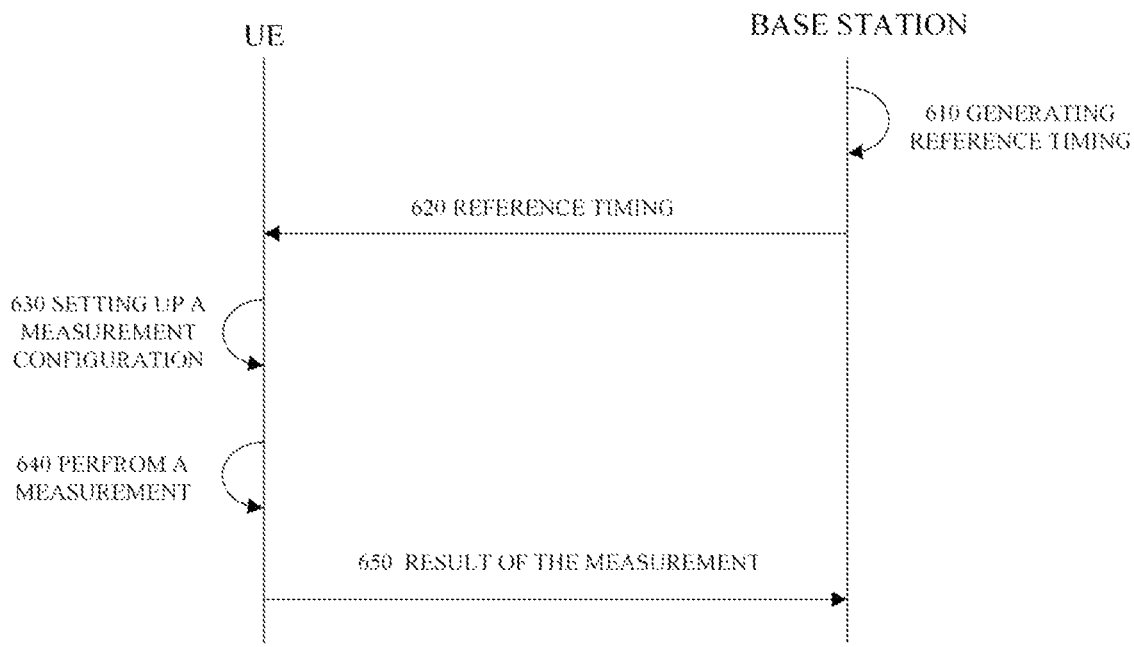
FIG. 6 illustrates a flowchart of exemplary steps for a target data measurement according to some other embodiments.

FIG. 6 illustrates a flowchart of exemplary steps for a target data measurement according to some other embodiments.

Referring to FIG. 6, at step S610, the base station may generate information including a reference timing in accordance with the current configuration. Step 610 can be implemented according to the description with reference to step S410.

Then at step S620, the base station may transmit the generated information including the reference timing to the UE. Step 620 can be implemented according to the description with reference to some of the embodiments of step S210 and/or step S310.

In response to receiving the information including the reference toning, at step S630, the CE may set up a target data measurement in accordance with the reference timing. Step 630 can be implemented according to the description with reference to step S220 and/or step S320.

Then at step S640, the UTE may perform a target data measurement based on the target data measurement configuration. Step 640 can be implemented according to the description with reference to step S230 and/or step S330.

After the measurement is performed, at step 650, a result of the target data measurement may be transmitted from the UE to the base station. Step 650 can be implemented according to the description with reference to step S420.

In addition, the UE may also determine whether to perform LBT in accordance with the current configuration, which is not illustrated in FIG. 6.

It should be understood that, although various steps for the target data measurement are shown in FIGS. 5-6, they are only for the purpose of illustration. The embodiments according to the present application may also include other steps, or variations of each step in FIGS. 5-6. In addition, it is also possible that not all of the steps in FIGS. 5-6 are necessary to be performed.

Figure 7:
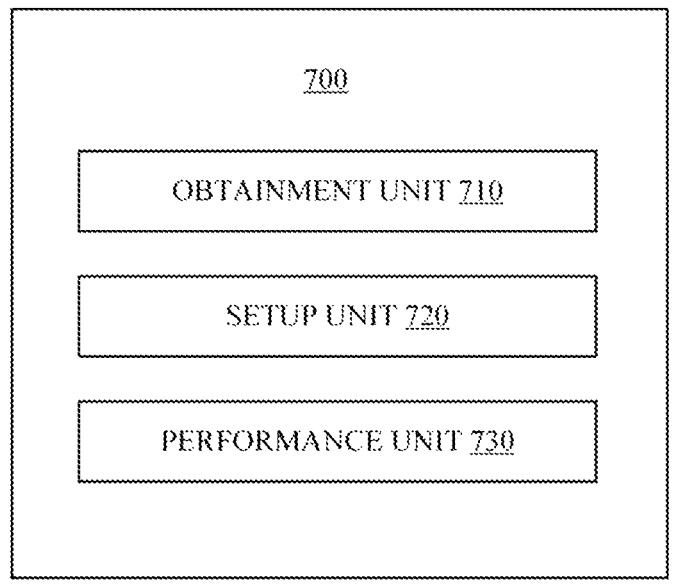
FIG. 7 illustrates an exemplary block diagram of an apparatus for a UE based on communication associated with NR-U in accordance with some embodiments.

FIG. 7 illustrates an exemplary block diagram of an apparatus 700 for a UE based on communication associated with NR-U in accordance with some embodiments. The apparatus 700 illustrated in FIG. 7 may be used to implement various steps of the method 200 or method 300 as illustrated in combination with FIGS. 2-3.

Referring to FIG. 7, the apparatus 700 may comprise an obtainment unit 710, a setup unit 720 and a performance unit 730.

The obtainment unit 710 may be configured to obtain information including a reference timing. The setup unit 720 may be configured to set up a target data measurement configuration in accordance with the reference timing. The performance unit 730 may be configured to perform a target data measurement in accordance with the target data measurement configuration.

According to the embodiments of the present application, by obtaining information including the reference timing from the base station, a target data measurement in unlicensed spectrum associated with the NR can be accurately implemented.

Figure 8:
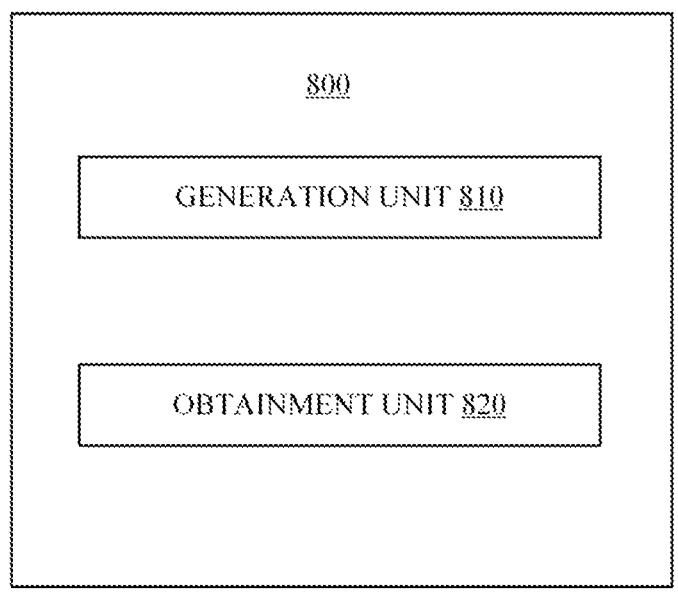
FIG. 8 illustrates an exemplary block diagram of an apparatus for a base station based on communication associated with NR-U in accordance with some embodiments.

FIG. 8 illustrates an exemplary block diagram of an apparatus 800 for a base station based on communication associated with NR-U in accordance with some embodiments. The apparatus 800 illustrated in FIG. 8 may be used to implement various steps of the method 400 as illustrated in combination with FIG. 4.

Referring to FIG. 8, the apparatus 800 may comprise a generation unit 810 and an obtainment unit 820.

The generation unit 810 may be configured to generate information including a reference timing for transmission to a UE. The reference timing is used for setting up a target data measurement configuration. The obtainment unit 820 may be configured to obtain from the UE, a result of the target data measurement based on the target data measurement configuration.

According to the embodiments of the present application, by determining different serving cells as the reference cell for the UE, an optimum result of the measurement may be obtained in different configurations.

According to another aspect of the present disclosure, an apparatus for a user equipment (UE) based on communication associated with New Radio (NR) in Unlicensed Spectrum (NR-U) is provided that comprises one or more processors configured to perform steps of the method for a user equipment (UE) based on communication associated with NR-U.

According to another aspect of the present disclosure, an apparatus for a base station based on communication associated with New Radio (NR) in Unlicensed Spectrum (NR-U) is provided that comprises one or more processors configured to perform steps of the method for a base station based on communication associated with NR-U.

According to another aspect of the present disclosure, a computer readable medium is provided that has computer programs stored thereon which, when executed by one or more processors, cause an apparatus to perform steps of the method for a user equipment (UE)/base station based on communication associated with New Radio (NR) in Unlicensed Spectrum (NR-U).

According to yet another aspect of the present disclosure, a computer program product is provided that comprises computer programs which, when executed by one or more processors, cause an apparatus to perform steps of the method for a user equipment (UE) base station based on communication associated with New Radio (NR) in Unlicensed Spectrum (NR-U).

Figure 9:
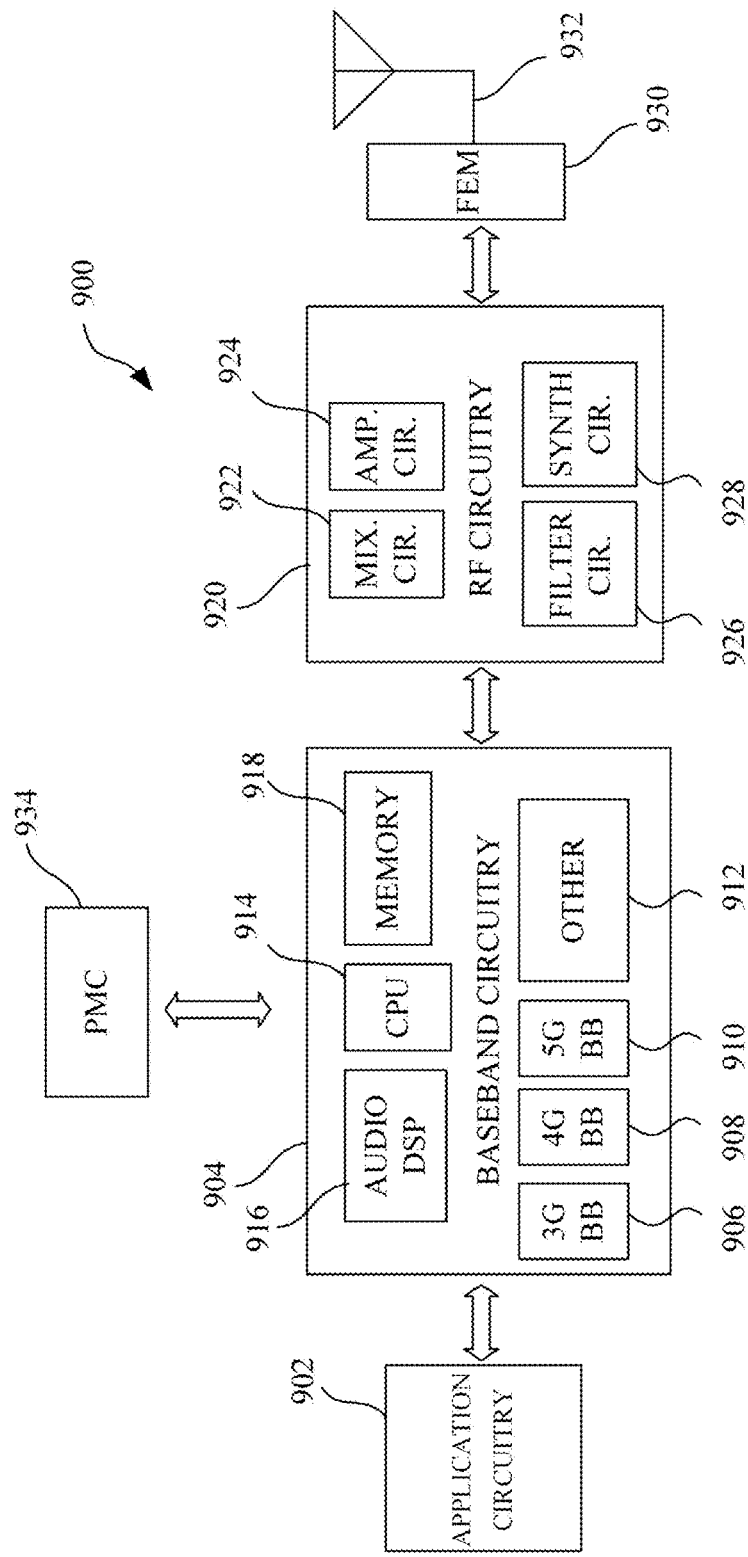
FIG. 9 illustrates a communication device (e.g., a UE or a base station) in accordance with some embodiments.

FIG. 9 illustrates example components of a device 900 in accordance with some embodiments. In some embodiments, the device 900 may include application circuitry 902, baseband circuitry 904. Radio Frequency (RF) circuitry (shown as RE circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a (IE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O)) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development of to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation demodulation, encoding/decoding, radio frequency shifting, etc. In some embodiments, modulation demodulation circuitry of the baseband circuitry 904 may include Fast-Fourier Transform (FFT), precoding, or constellation mapping/demapping functionality. In some embodiments, encoding decoding circuitry of the baseband circuitry 904 may include convolution, tail-biting convolution, turbo, Viterbi, or Low Density Parity Check (LDPC) encoder decoder functionality. Embodiments of modulation demodulation and encoder decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RE circuitry 920 may include mixer circuitry 922, amplifier circuitry 924 and filter circuitry 926. In some embodiments, the transmit signal path of the RF circuitry 920 may include filter circuitry 926 and mixer circuitry 922. The RE circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RE signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional –N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RI circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO) although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RE circuitry 920 may include an IQ/polar converter.

The FEM circuitry 930 may include a receive signal path which may include circuitry configured to operate on RE signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RE circuitry 920 for transmission by one or more of the one or more antennas 932. In various embodiments, the amplification through the transmit or receive signal paths may be done solely in the RE circuitry 920, solely in the FEM circuitry 930, or in both the RF circuitry 920 and the FEM circuitry 930.

In some embodiments, the FEM circuitry 930 may include a TX RX switch to switch between transmit mode and receive mode operation. The FEM circuitry 930 may include a receive signal path and a transmit signal path. The receive signal path of the FEM circuitry 930 may include an LNA to amplify received RE signals and provide the amplified received RE signals as an output (e.g., to the RE circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 804. In particular, the PMC 934 may control power-source selection, voltage scaling, battery charging, or DC-to-DC conversion. The PMC 934 may often be included when the device 900 is capable of being powered by a battery, for example, when the device 900 is included in a EGE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected stale.

An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
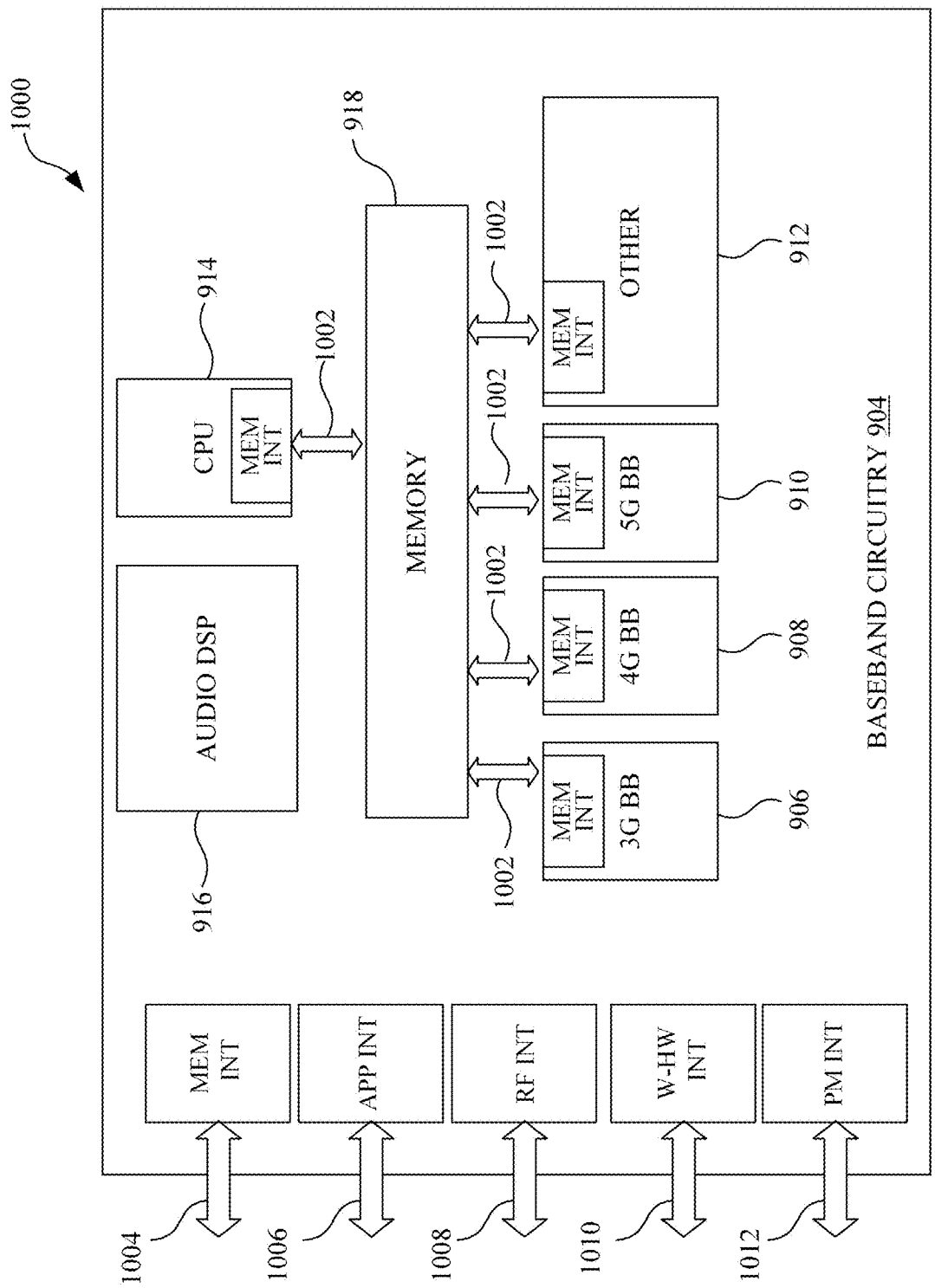
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 8 may comprise 3G baseband processor 906, 46 baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RE circuitry interface 1008 (e.g., an interface to send/receive data to/from RF circuitry 920 of FIG. 9), a wireless hardware connectivity interface 1010 (e.g., an interface to send/receive data to/from Near Field Communication (NFC) components, Bluetooth® components (e.g. Bluetooth® Low Energy). Wi-Fi® components, and other communication components), and a power management interface 1012 (e.g., an interface to send/receive power or control signals to/from the PMC 1034).

Figure 11:
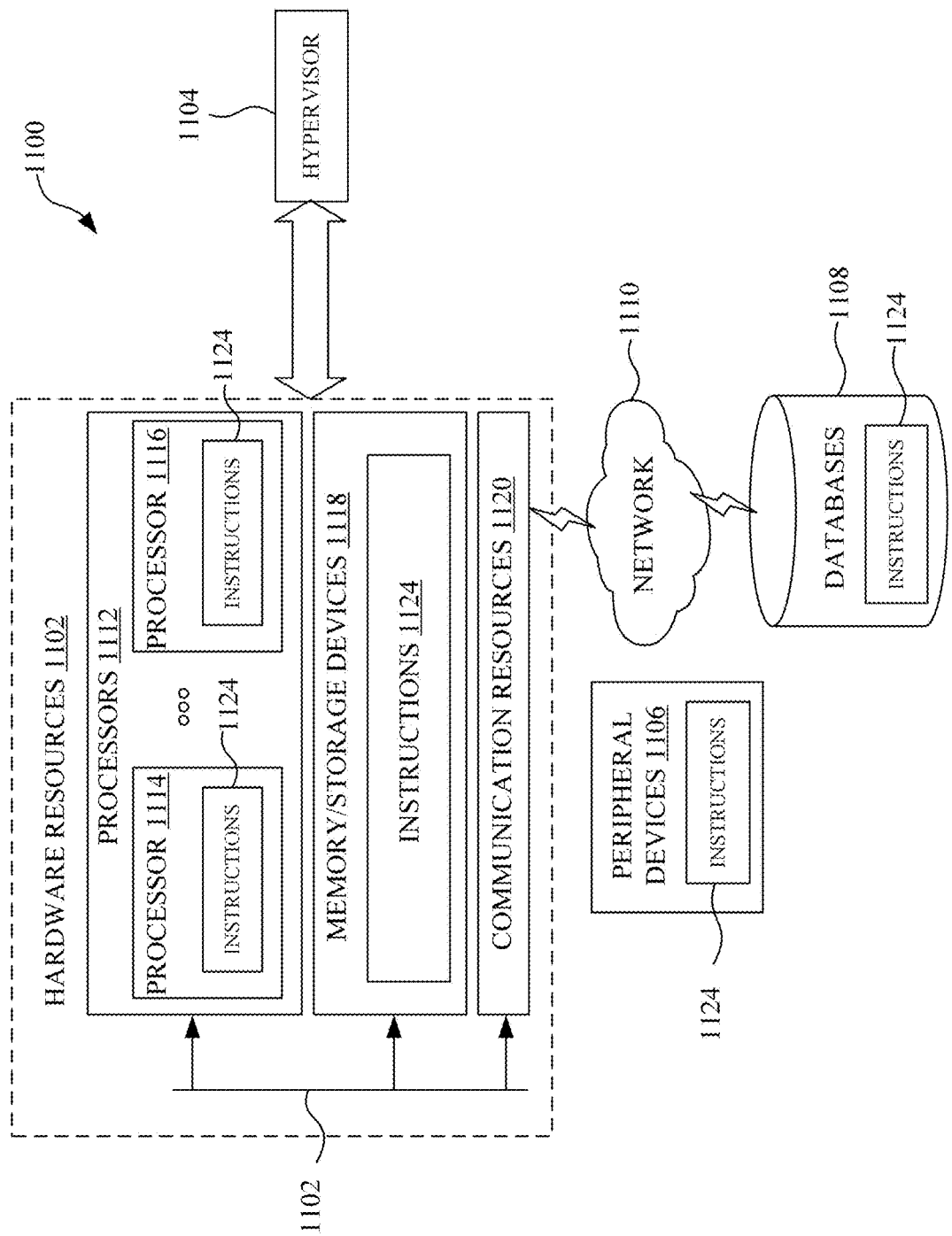
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically. FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM). Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy). Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and for methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
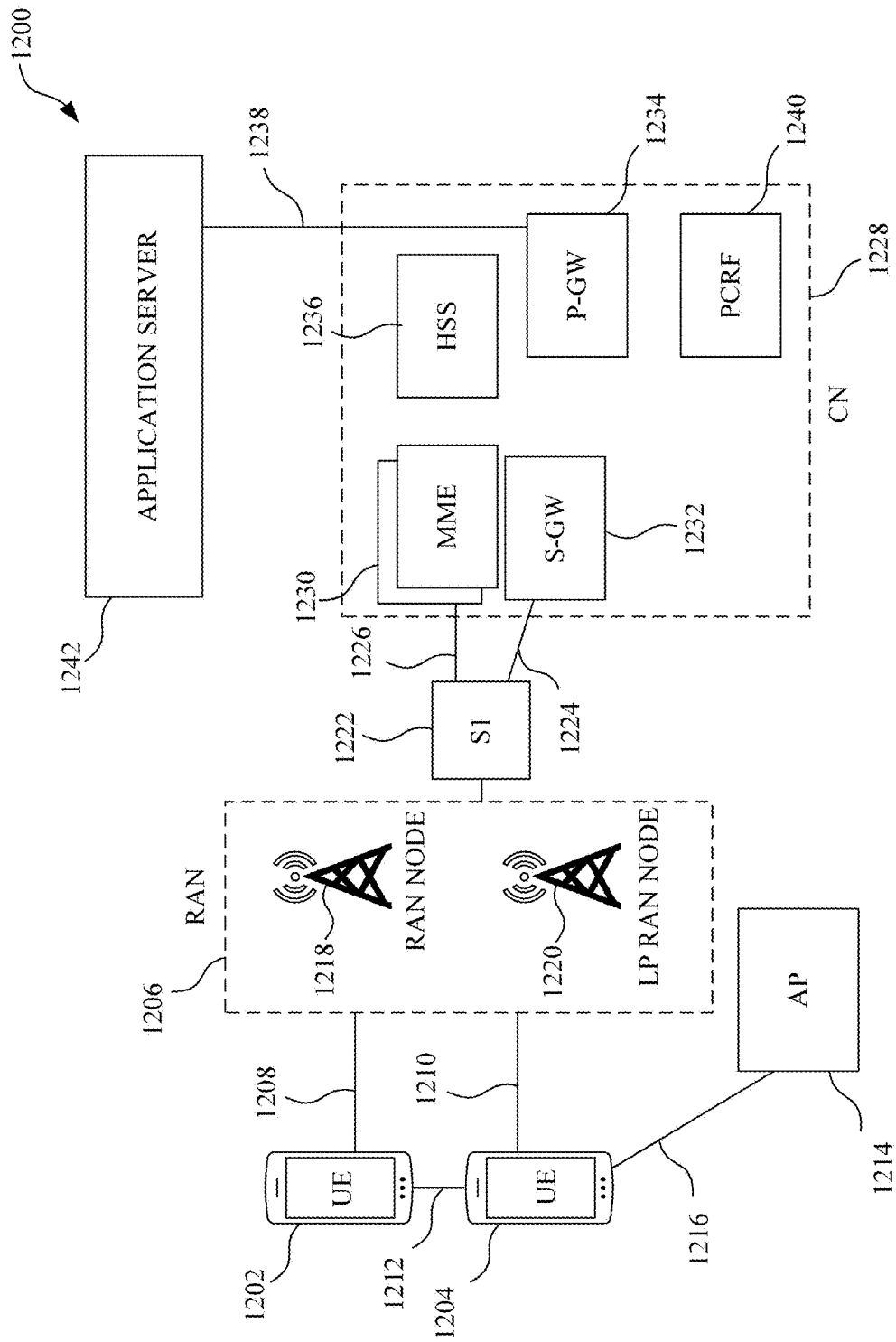
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MIC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g. keep-alive messages, status updates, etc.) to facilitate the connections of the IoT network.

The UE 1202 and the UE 1204 may be configured to connect, e.g. communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which comprises a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The Probe interface 1212 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The CE 1204 is shown to be configured to access an access point (AP), shown as AP 1214, via connection 1216. The connection 1216 can comprise a local wireless connection, such as a connection consistent with any IEEE 802.11 protocol, wherein the AP 1214 would comprise a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSS). NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells). e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1218 and the IP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UTE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCE, where each CCE may correspond to nine sets of four physical resource elements known as resource element groups (RE(s). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an SI interface 1222. In embodiments, the CN 1228 may be an evolved packet core (EPC) network, a NextGen Packet Core (NPC) network, or some other type of CN. In this embodiment the SI interface 1222 is split into two parts: the SI-U interface 1224, which carries traffic data between the macro RAN node 1218 and the LP RAN node 1220 and a serving gateway (S-GW), shown as S-GW 1232, and an S1-mobility management entity (MME) interface, shown as S1-MMI; interface 1226, which is a signaling interface between the macro RAN node 1218 and LP RAN node 1220 and the MME(s) 1230.

In this embodiment, the CN 1228 comprises the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may comprise a database for network users, including subscription-related information to support the network entities' handling of communication sessions. The CN 1228 may comprise one or several HISS 1236, depending on the number of mobile subscribers, on the capacity of the equipment, on the organization of the network, etc. For example, the HSS 1236 can provide support for routing roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain. LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VoIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session; a Home PCRF (H-PCRF) within a HPLMN and a Visited PCRF (V-PCRF) within a Visited Public Land Mobile Network (VPLMN). The PORE 1240 may be communicatively coupled to the application server 1242 via the P-GW 1234. The application server 1242 may signal the PCRF 1240 to indicate a new service flow and select the appropriate Quality of Service (QOS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE) based on communication associated with New Radio (NR) in Unlicensed Spectrum (NR-U), comprising: obtaining information including a reference timing; setting up a target data measurement configuration in accordance with the reference timing; and performing a target data measurement in accordance with the target data measurement configuration.

Example 2 is the method according to Example 1, wherein the target data measurement configuration comprises at least one of: Received Signal Strength Indicator (RSSI) measurement tuning configuration (RMTC); Synchronization Signal Physical Broadcast Channel block measurement timing configuration (SMTC); and Measurement Gap (MG) configuration.

Example 3 is the method according to Example 2, wherein the communication is associated with carrier aggregation between NR in licensed spectrum and the NR-U. and obtaining the information including the reference timing comprises: obtaining a timing associated with a reference cell as the reference timing, wherein the reference cell is an active serving cell.

Example 4 is the method according to Example 3, wherein the reference cell is a Primary Cell (PCell), and the reference timing is a timing of one of active serving cells, which are in the same Primary Timing Advance Group (pTAG) as the PCell, the method further comprising: based on a result of the target data measurement, selectively using the current reference cell or another serving cell, which is in the same pTAG as the current reference cell, as a new reference cell.

Example 5 is the method according to Example 3, wherein obtaining a timing associated with a reference cell as the reference timing comprises: obtaining, from network side, an indication of which active serving cell associated with the NR-U to be selected as the reference cell; and obtaining a timing of one of active serving cells, which are in the same Timing Advance Group (TAG) as the indicated reference cell, as the reference timing.

Example 6 is the method according to Example 5, further comprising: performing Listen Before Talk (LBT) to determine whether there is a failure indicating that the selected reference cell is unavailable; and in response to determining that there is a failure indicating that the selected reference cell is unavailable for a time threshold; using another active serving cell associated with the NR-U as a new reference cell, wherein the another active serving cell is in the same TAG as the unavailable selected reference cell; or maintaining the unavailable selected reference cell as the reference cell.

Example 7 is the method according to Example 6, further comprising: based on a result of the target data measurement, selectively using the current reference cell or another serving cell, which is in the same TAG as the current reference cell, as a new reference cell.

Example 8 is the method according to Example 2, wherein the communication is associated with dual connectivity between Long Term Evolution (LTE) in licensed spectrum and the NR-U. and obtaining the information including the reference timing comprises: obtaining a timing associated with a reference cell as the reference timing, wherein the reference cell is an active serving cell.

Example 9 is the method according to Example 8, wherein the MG and one or more of the RMTC and the SMTC are configured from LTE Master Node (MN), and wherein the reference cell is a Primary Cell (PCell), and the reference timing is a timing of one of active serving cells, which are in the same Primary Timing Advance Group (pTAG) as the PCell.

Example 10 is the method according to Example 8, wherein the MG and one or more of the RMTC and the SMTC are configured from LTE Master Node (MN), and obtaining a timing associated with a reference cell as the reference timing comprises: obtaining, from network side, an indication of which active serving cell associated with the LTE in licensed spectrum to be selected as the reference cell; and obtaining a timing of one of active serving cells, which are in the same Timing Advance Group (TAG) as the indicated reference cell, as the reference timing.

Example 11 is the method according to Example 9 or Example 10, further comprising: based on a result of the target data measurement, selectively using the current reference cell or another serving cell, which is in the same Timing Advance Group (TAG) as the current reference cell, as a new reference cell.

Example 12 is the method according to Example 8, wherein one or more of the RMTC and the SMTC are configured from NR-U Secondary Node (SN), and wherein the reference cell is a Primary Secondary Cell (PSCell), and the reference timing is a timing of one of active serving cells, which are in the same Timing Advance Group (TAG) as the PSCell.

Example 13 is the method according to Example 8, wherein one or more of the RMTC and the SMTC are configured from NR-U Secondary Node (SN), and obtaining a timing associated with a reference cell as the reference timing comprises: obtaining, from network side, an indication of which active serving cell associated with the NR-U to be selected as the reference cell; and obtaining a timing of one of active serving cells, which are in the same Timing Advance Group (TAG) as the indicated reference cell, as the reference timing.

Example 14 is the method according to Example 12 or Example 13, further comprising: performing Listen Before Talk (LBT) to determine whether there is a failure indicating that the reference cell is unavailable; and in response to determining that there is a failure indicating that the reference cell is unavailable for a time threshold; using another active serving cell associated with the NR-IT as a new reference cell, wherein the another active serving cell is in the same Timing Advance Group (TAG) as the unavailable selected reference cell; or maintaining the unavailable selected reference cell as the reference cell.

Example 15 is the method according to Example 12 or Example 13, further comprising: based on a result of the target data measurement, selectively using the current reference cell or another serving cell, which is in the same Timing Advance Group (TAG) as the current reference cell, as a new reference cell.

Example 16 is the method according to Example 2, wherein the communication is associated with stand-alone NR-U. and obtaining the information including the reference timing comprises: obtaining a timing associated with a reference cell as the reference timing, wherein the reference cell is an active serving cell.

Example 17 is the method according to Example 16, wherein the reference cell is a Primary Cell (PCell); and the reference timing is a timing of one of active serving cells, which are in the same Primary Timing Advance Group (pTAG) as the PCell.

Example 18 is the method according to Example 16, wherein obtaining a timing associated with a reference cell as the reference timing comprises: obtaining from network side, an indication of which active serving cell associated with the NR-U to be selected as the reference cell; and obtaining a timing of one of active serving cells, which are in the same Timing Advance Group (TAG) as the indicated reference cell, as the reference timing.

Example 19 is the method according to Example 18, further comprising: performing Listen Before Talk (LBT) to determine whether there is a failure indicating that the reference cell is unavailable; and in response to determining that there is a failure indicating that the reference cell is unavailable for a time threshold; using another active serving cell associated with the NR-U as a new reference cell, wherein the another active serving cell is in the same Timing Advance Group (TAG) as the unavailable selected reference cell; or maintaining the unavailable selected reference cell as the reference cell.

Example 20 is the method according to any of Examples 16-19, further comprising: based on a result of the target data measurement, selectively using the current reference cell or another serving cell, which is in the same Timing Advance Group (TAG) as the current reference cell, as a new reference cell.

Example 21 is a method for a base station based on communication associated with New Radio (NR) in Unlicensed Spectrum (NR-U), comprising: generating information including a reference timing for transmission to a user equipment (UE), wherein the reference timing is used for setting up a target data measurement configuration; and obtaining, from the UE, a result of the target data measurement based on the target data measurement configuration.

Example 22 is the method according to Example 21, wherein the target data measurement configuration comprises at least one of: Received Signal Strength Indicator (RSSI) measurement timing configuration (RMTC). Synchronization Signal Physical Broadcast Channel block measurement timing configuration (SMTC); and Measurement Gap (MG) configuration.

Example 23 is the method according to Example 22, wherein generating information including a reference timing for transmission to the UE comprises: generating an indication of which active serving cell to be selected as a reference cell, wherein a timing of one of the active serving cells, which are in the same Timing Advance Group (TAG) as the indicated reference cell, is to be used as the reference timing.

Example 24 is an apparatus for a user equipment (UE) based on communication associated with New Radio (NR) in Unlicensed Spectrum (NR-U), the apparatus comprising: one or more processors configured to perform steps of the method according to any of Examples 1-20.

Example 25 is an apparatus for a base station based on communication associated with New Radio (NR) in Unlicensed Spectrum (NR-U), the apparatus comprising one or more processors configured to perform steps of the method according to any of Examples 21-23.

Example 26 is a computer readable medium having computer programs stored thereon which, when executed by one or more processors, cause an apparatus to perform steps of the method according to any of Examples 1-23.

Example 27 is an apparatus for a communication device, comprising means for performing steps of the method according to any of Examples 1-23.

Example 28 is a computer program product comprising computer programs which, when executed by one or more processors, cause an apparatus to perform steps of the method according to any of Examples 1-23.

Any of the above described examples may be combined with any other example for combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc, of one embodiment can be used in another embodiment. The parameters/attributes/aspects/etc, are merely described in one or more embodiments for clarity, and it is recognized that the parameters attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive and the description is not to be limited to the details given herein but may be modified within the scope and equivalents of the appended claims.

The invention claimed is:

1. A method for a user equipment (UE) based on communication associated with New Radio (NR) in Unlicensed Spectrum (NR-U), comprising:
   obtaining information including a reference timing;
   setting up a target data measurement configuration in accordance with the reference timing;
   performing a target data measurement in accordance with the target data measurement configuration;
   performing Listen Before Talk (LBT) to determine whether there is a failure indicating that a selected reference cell is unavailable, wherein the selected reference cell is an active serving cell corresponding to the reference timing; and
   in response to determining that there is a failure indicating that the selected reference cell is unavailable for a time threshold:
      using another active serving cell associated with the NR-U as a new reference cell, wherein the another active serving cell is in a same Timing Advance Group (TAG) as the selected reference cell that is unavailable; or
      maintaining the selected reference cell as the reference cell.

2. The method according to claim 1, wherein the target data measurement configuration comprises at least one of:
   Received Signal Strength Indicator (RSSI) measurement timing configuration (RMTC);
   Synchronization Signal/Physical Broadcast Channel block measurement timing configuration (SMTC); and
   Measurement Gap (MG) configuration.

3. The method according to claim 2, wherein the communication is associated with carrier aggregation between NR in licensed spectrum and the NR-U, and obtaining the information including the reference timing comprises:
   obtaining a timing associated with a reference cell as the reference timing.

4. The method according to claim 3, wherein the reference cell is a Primary Cell (PCell), and the reference timing is a timing of one of active serving cells, which are in the same Primary Timing Advance Group (pTAG) as the PCell, the method further comprising:
   based on a result of the target data measurement, selectively using a current reference cell or another serving cell, which is in the same pTAG as the current reference cell, as a new reference cell.

5. The method according to claim 3, wherein obtaining the timing associated with the reference cell as the reference timing comprises:
obtaining, from network side, an indication of which active serving cell associated with the NR-U to be selected as the reference cell; and
obtaining a timing of one of active serving cells, which are in the same TAG as the indicated reference cell, as the reference timing.

6. The method according to claim 5, further comprising:
based on a result of the target data measurement, selectively using a current reference cell or another serving cell, which is in the same TAG as the current reference cell, as a new reference cell.

7. The method according to claim 2, wherein the communication is associated with dual connectivity between Long Term Evolution (LTE) in licensed spectrum and the NR-U, and obtaining the information including the reference timing comprises:
obtaining a timing associated with a reference cell as the reference timing.

8. The method according to claim 7, wherein the MG and one or more of the RMTC and the SMTC are configured from LTE Master Node (MN), and wherein:
the reference cell is a Primary Cell (PCell); and
the reference timing is a timing of one of active serving cells, which are in the same Primary Timing Advance Group (pTAG) as the PCell.

9. The method according to claim 7, wherein the MG and one or more of the RMTC and the SMTC are configured from LTE Master Node (MN), and obtaining a timing associated with a reference cell as the reference timing comprises:
obtaining, from network side, an indication of which active serving cell associated with the LTE in licensed spectrum to be selected as the reference cell; and
obtaining a timing of one of active serving cells, which are in the same TAG as the indicated reference cell, as the reference timing.

10. The method according to claim 9, further comprising:
based on a result of the target data measurement, selectively using a current reference cell or another serving cell, which is in the same TAG as the current reference cell, as a new reference cell.

11. The method according to claim 7, wherein one or more of the RMTC and the SMTC are configured from NR-U Secondary Node (SN), and wherein:
the reference cell is a Primary Secondary Cell (PSCell); and
the reference timing is a timing of one of active serving cells, which are in the same TAG as the PSCell.

12. The method according to claim 7, wherein one or more of the RMTC and the SMTC are configured from NR-U Secondary Node (SN), and obtaining a timing associated with a reference cell as the reference timing comprises:
obtaining, from network side, an indication of which active serving cell associated with the NR-U to be selected as the reference cell; and
obtaining a timing of one of active serving cells, which are in the same TAG as the indicated reference cell, as the reference timing.

13. The method according to claim 12, further comprising:
performing LBT to determine whether there is a failure indicating that the reference cell is unavailable; and
in response to determining that there is a failure indicating that the reference cell is unavailable for a time threshold:
using another active serving cell associated with the NR-U as a new reference cell, wherein the another active serving cell is in the same TAG as the unavailable selected reference cell; or
maintaining the unavailable selected reference cell as the reference cell.

14. The method according to claim 12, further comprising:
based on a result of the target data measurement, selectively using a current reference cell or another serving cell, which is in the same TAG as the current reference cell, as a new reference cell.

15. The method according to claim 2, wherein the communication is associated with stand-alone NR-U, and obtaining the information including the reference timing comprises:
obtaining a timing associated with a reference cell as the reference timing, wherein the reference cell is the active serving cell.

16. The method according to claim 15, wherein:
the reference cell is a Primary Cell (PCell); and
the reference timing is a timing of one of active serving cells, which are in the same Primary Timing Advance Group (pTAG) as the PCell.

17. The method according to claim 15, wherein obtaining a timing associated with a reference cell as the reference timing comprises:
obtaining, from network side, an indication of which active serving cell associated with the NR-U to be selected as the reference cell; and
obtaining a timing of one of active serving cells, which are in the same TAG as the indicated reference cell, as the reference timing.

18. The method according to claim 17, further comprising:
performing LBT to determine whether there is a failure indicating that the reference cell is unavailable; and
in response to determining that there is a failure indicating that the reference cell is unavailable for a time threshold:
using another active serving cell associated with the NR-U as a new reference cell, wherein the another active serving cell is in the same TAG as the unavailable selected reference cell; or
maintaining the unavailable selected reference cell as the reference cell.

19. The method according to claim 18, further comprising:
based on a result of the target data measurement, selectively using a current reference cell or another serving cell, which is in the same TAG as the current reference cell, as a new reference cell.

* * * * *